United States Patent
Ito et al.

(10) Patent No.: US 8,146,454 B2
(45) Date of Patent: Apr. 3, 2012

(54) VEHICLE RANGE SWITCHING DEVICE

(75) Inventors: Yoshinobu Ito, Anjo (JP); Kazushige Nakagawa, Anjo (JP); Naotaka Murakami, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 490 days.

(21) Appl. No.: 12/402,866

(22) Filed: Mar. 12, 2009

(65) Prior Publication Data

US 2009/0241713 A1    Oct. 1, 2009

(30) Foreign Application Priority Data

Mar. 31, 2008   (JP) ................................. 2008-093352

(51) Int. Cl.
*F16H 63/30* (2006.01)
(52) U.S. Cl. .................................... 74/473.1; 74/473.36
(58) Field of Classification Search .. 74/473.12–473.16, 74/473.3–473.36; 404/84.05, 118
See application file for complete search history.

(56) References Cited

U.S. PATENT DOCUMENTS

| | | | |
|---|---|---|---|
| 6,401,899 B1* | 6/2002 | Kanehisa et al. | 192/219.5 |
| 7,658,123 B2* | 2/2010 | Hori et al. | 74/335 |
| 2002/0100658 A1* | 8/2002 | Williams et al. | 192/220 |
| 2004/0018907 A1* | 1/2004 | Tsuzuki et al. | 475/132 |
| 2004/0216546 A1* | 11/2004 | Shiomi et al. | 74/335 |
| 2005/0120819 A1 | 6/2005 | Kawada | |
| 2007/0044583 A1 | 3/2007 | Hori et al. | |
| 2007/0129199 A1 | 6/2007 | Tanaka et al. | |
| 2009/0031835 A1* | 2/2009 | Inoue et al. | 74/335 |
| 2009/0241715 A1* | 10/2009 | Tanaka et al. | 74/473.12 |
| 2010/0256880 A1* | 10/2010 | Sato | 701/55 |
| 2010/0274454 A1* | 10/2010 | Nishimura et al. | 701/54 |
| 2011/0066323 A1* | 3/2011 | Nishimura | 701/35 |

FOREIGN PATENT DOCUMENTS

| | | |
|---|---|---|
| JP | 52-103251 U | 8/1977 |
| JP | 61-182420 U | 11/1986 |
| JP | 2002-48233 A | 2/2002 |
| JP | 2003-232420 A | 8/2003 |
| JP | 2003-254434 A | 9/2003 |
| JP | 2004-11762 A | 1/2004 |
| JP | 2007-056961 A | 3/2007 |
| JP | 2007-100766 A | 4/2007 |

* cited by examiner

*Primary Examiner* — Raymond W Addie
(74) *Attorney, Agent, or Firm* — Sughrue Mion, PLLC (57) ABSTRACT

A vehicle range switching device including a motor that is controlled according to operation of a shift range selecting portion, a driving portion that is driven by the motor, and a detecting portion for detecting a pivot position of a range control shaft for transmitting driving force from the driving portion to a shift range operating portion for switching a shift range, comprising: a case member accommodating the driving portion and the detecting portion; a support portion pivotally supported by the case member and having a recess for mounting one end of the range control shaft therein, wherein the support portion and the case member are sealed; and a removing unit disposed in the recess of the support portion for removing a play between the one end of the range control shaft and the recess of the support portion.

7 Claims, 5 Drawing Sheets

FIG. 5

VEHICLE RANGE SWITCHING DEVICE

INCORPORATION BY REFERENCE

The disclosure of Japanese Patent Application No. 2008-093352 filed on Mar. 31, 2008, including the specification, drawings and abstract is incorporated herein by reference in its entirety.

BACKGROUND OF THE INVENTION

The present invention relates to a range switching device which is mounted on a vehicle. More particularly, the present invention relates to a range switching device (a so-called shift-by-wire system) for controlling a motor according to a drive range (e.g., P, R, N, D) selected by operation of a shift range selecting portion such as a shift lever, and operating a shift range operating portion such as a manual valve and a parking gear mechanism through a range control shaft to switch a shift range.

Description of the Related Art

A range switching device of a so-called shift-by-wire system has been proposed recently for switching a shift range by a motor. This range switching device operates as follows: driving force of the motor controlled according to operation of a shift lever is transmitted to a range control shaft through a driving portion, thereby pivoting the range control shaft. A hydraulic control device and a parking gear mechanism of an automatic transmission are then operated through a detent lever fixed to the range control shaft. The range switching device thus switches a shift range. A range position detection sensor as a detecting portion detects the pivot position of the detent lever, that is, the pivot position of the range control shaft. The range switching device thus controls the shift-range switching operation while detecting the range switching state.

In the range switching device, the range control shaft extends through the detecting portion and an arm member is fixed to one end of the range control shaft. In order to obtain a watertight state inside a case member, a waterproof structure is implemented by a sealant disposed between the range control shaft and the detecting portion. In this structure, however, water may enter the case through the range control shaft, and the waterproof effect is not sufficient. Improvement has therefore been desired.

A range switching device which includes an output shaft rotatably supported by a front housing as a case member and connected to a control rod as a range control shaft has been proposed (e.g., see Japanese Patent Application Publication No. 2007-56961). In this range switching device, the output shaft has spline grooves and the control rod has spline teeth so that the output shaft and the control rod are spline-fitted to each other.

SUMMARY OF THE INVENTION

In the range switching device having the above spline structure, a waterproof property can be improved by providing a sealant between the output shaft and the front housing as the case member. However, since the control rod as the range control shaft and the output shaft are spline-fitted to each other, the control rod may become loose. Such a loose control rod may increase the detection error of the pivot position of the control rod, thereby leading to unstable operation.

The present invention is made in view of the above problems, and it is an object of the present invention to provide a vehicle range switching device capable of preventing a range control shaft from becoming loose while improving a waterproof property.

According to an aspect of the present invention, a vehicle range switching device including a motor that is controlled according to operation of a shift range selecting portion, a driving portion that is driven by the motor, and a detecting portion for detecting a pivot position of a range control shaft for transmitting driving force from the driving portion to a shift range operating portion for switching a shift range is characterized by including: a case member accommodating the driving portion and the detecting portion; a support portion pivotally supported by the case member and having a recess for mounting one end of the range control shaft therein, wherein the support portion and the case member are sealed; and removing units disposed in the recess of the support portion for removing a play between the one end of the range control shaft and the recess of the support portion.

Since the range control shaft is mounted in the recess of the support portion, water flowing along the range control shaft is blocked by the recess and is thus prevented from entering the case member, whereby a waterproof property is improved. Moreover, since the removing unit for removing a play is disposed in the recess of the support portion, the range control shaft and the support portion fit each other non-pivotally with respect to each other. As a result, the range control shaft is prevented from becoming loose, and the detecting portion detects the pivot position of the range control shaft with a reduced detection error, whereby shift-range switching operation is stabilized.

The above vehicle range switching device is characterized in that the one end of the range control shaft has at least two parallel chamfered surfaces, the recess has two parallel side surfaces respectively facing the chamfered surfaces, and the removing units are pressing units disposed between the two chamfered surfaces and the two side surfaces for pressing the two chamfered surfaces and the two side surfaces.

Since the two parallel chamfered surfaces respectively face the two parallel side surfaces, the support portion and the range control shaft can be effectively made non-pivotable with respect to each other. Moreover, since the two parallel chamfered surfaces and the two parallel side surfaces are pressed by the pressing unit, the one end of the range control shaft is firmly pressed, whereby the range control shaft can be effectively prevented from becoming loose.

The above vehicle range switching device is characterized in the pressing unit is a plate spring having a substantially U-shaped cross section, being fitted in the recess and elastically deformed to be fitted between the two chamfered surfaces and the two side surfaces, thereby holding the one end of the range control shaft.

Since the pressing unit is a plate spring, both chamfered surfaces of the one end of the range control shaft are pressed by the elastically deformed plate spring. Since the plate spring holds the one end of the range control shaft from both sides, the range control shaft is effectively prevented from becoming loose and the detecting portion detects the pivot position of the range control shaft with a reduced detection error, whereby shift-range switching operation is stabilized.

The above vehicle range switching device is characterized in that the plate spring has protrusions respectively protruding toward the two side surfaces, and the two side surfaces have engaging portions for engaging the respective protrusions.

Since the protrusions of the plate spring are engaged in the engaging portions of the recess of the support portion, the plate spring can be prevented from falling off the recess, for example, when the range control shaft is removed for maintenance or the like, or during transportation before the range switching device is mounted on a vehicle. The plate spring can therefore be prevented from being lost.

The above vehicle range switching device is characterized in that the removing unit is a tapered portion that is tapered toward a bottom surface of the recess and one end of the range control shaft is pressed into the tapered portion.

The tapered portion enables the range control shaft to be smoothly inserted in the recess. Moreover, since the one end of the range control shaft is pressed into the tapered portion in the recess, the range control shaft is effectively prevented from becoming loose and the detecting portion detects the pivot position of the range control shaft with a reduced detection error, whereby shift-range switching operation is stabilized.

The above vehicle range switching device is characterized in that the driving portion has a converting mechanism for converting rotary motion of the motor to linear motion, and an arm member for converting the liner motion obtained by the converting mechanism to swing motion, the arm member is attached to the support portion, and the range control shaft is pivoted integrally with the support portion by the swing motion of the arm member.

Since the one end of the range control shaft and the support portion are thus integrally pivoted without becoming loose, the arm member need not be directly attached to the range control shaft. By attaching the arm member to the support portion, the driving force of the arm member can be transmitted to the range control portion while assuring a waterproof property.

The above vehicle range switching device is characterized in that the vehicle range switching device further includes a fixing bolt and a plate member having pawl portions at its both ends, the support portion has fitting portions in which the pawl portions of the plate member are respectively fitted, and the pawl portions of the plate member are fitted in the fitting portions of the support member through the arm member, and the plate member and the arm member are integrally fixed to the support portion by the fixing bolt.

The support portion is thus pivoted by swing motion of the arm member. If the arm member and the support portion are fixed to each other only by a bolt, the arm member may be displaced with respect to the support portion due to impact or the like. The above structure, however, has the plate member having the pawl portions. The arm member and the support portion can therefore be more firmly fixed to each other with a simple structure. As a result, the arm member is prevented from being displaced with respect to the support portion, and the detecting portion detects the pivot position of the range control shaft with a reduced detection error, whereby shift-range switching operation is further stabilized.

DETAILED DESCRIPTION OF THE EMBODIMENTS

Hereinafter, best modes for carrying out the present invention will be described in detail with reference to the accompanying drawings.

[First Embodiment]

Figure 1:
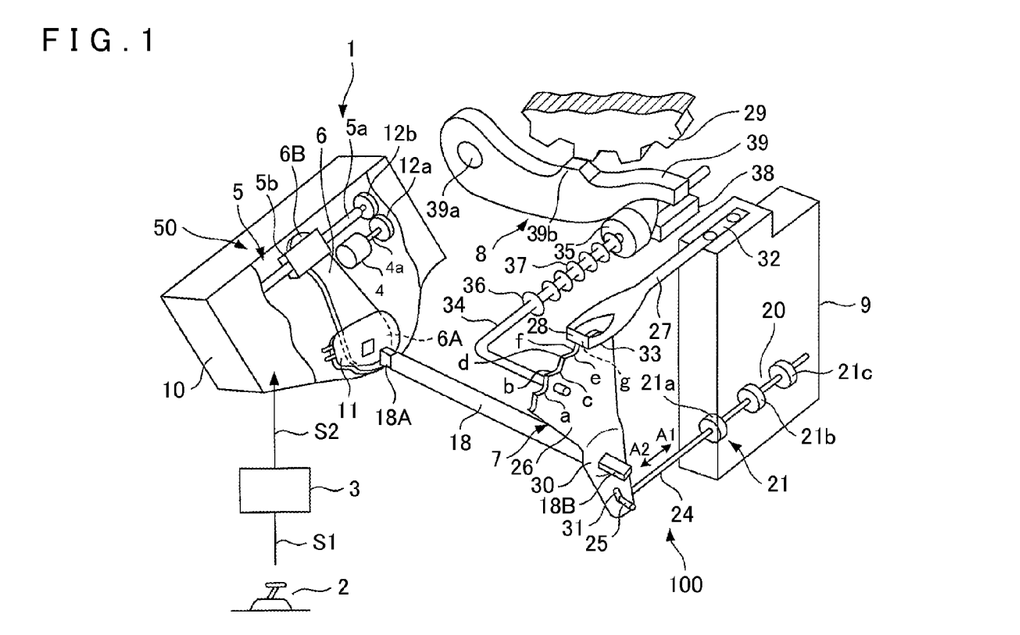
FIG. 1 is a schematic view showing a range switching device according to a first embodiment and a peripheral mechanism thereof.
Figure 2:
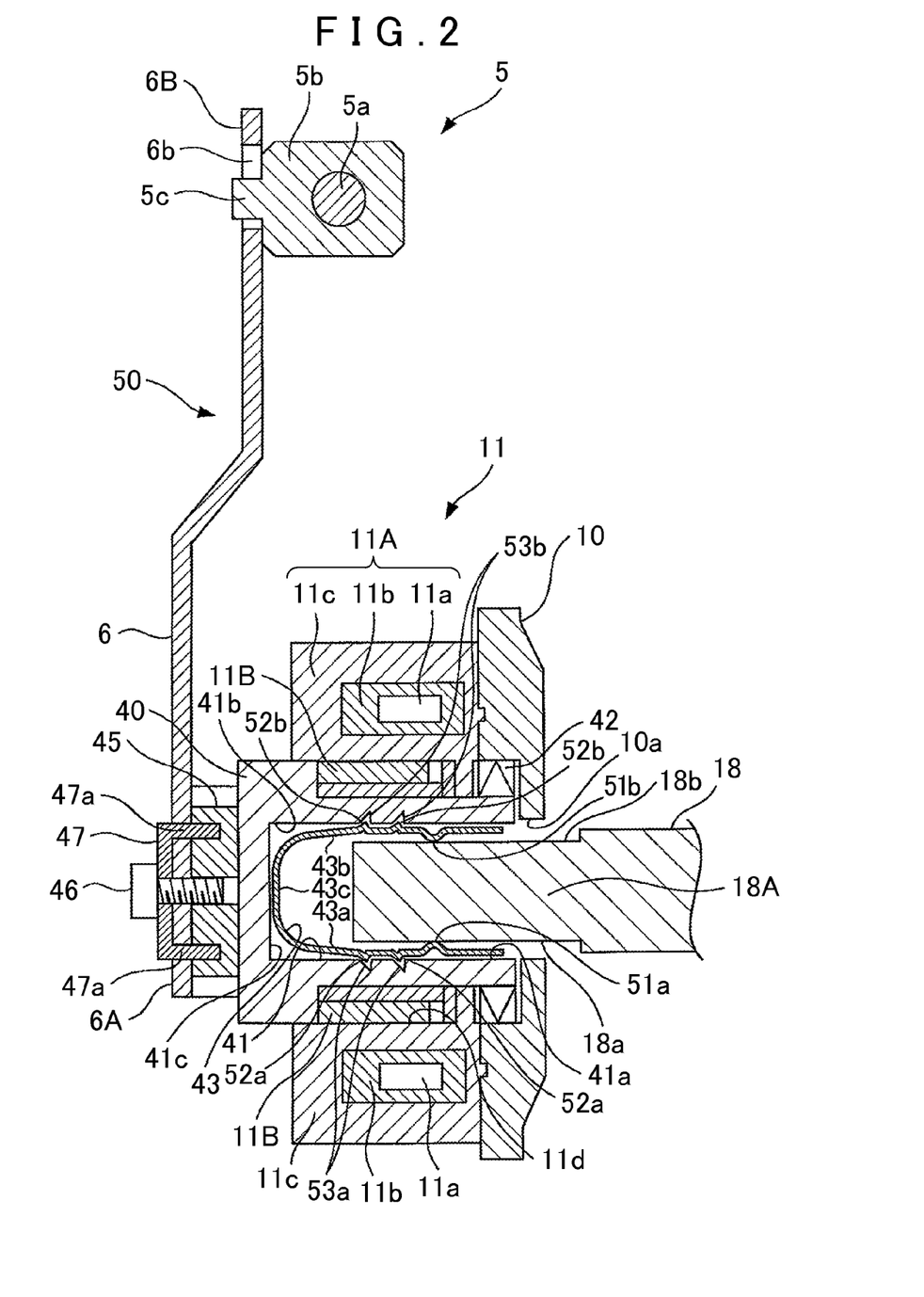
FIG. 2 is a schematic cross-sectional view of a main part of the range switching device of the first embodiment.

FIG. 1 shows a range switching device 1 of a first embodiment as an example of a vehicle range switching device of the present invention. FIG. 1 schematically shows the respective structures of the range switching device 1, a detent mechanism 7, a parking gear mechanism 8, and a valve body 9. FIG. 2 is a schematic cross-sectional view of a main part of the range switching device 1 of the first embodiment.

The range switching device 1 is integrated into an automatic transmission mounted on a vehicle (e.g., a multi-stage automatic transmission or a continuously variable transmission (CVT)). As shown in FIG. 1, the range switching device 1 includes a control device (control portion) 3, a motor 4, a driving portion 50, and a range position detection sensor (detecting portion) 11. The control device 3 generates a control signal S2 based on a shift signal (electric signal) S1 from a shift lever (shift range selecting portion) 2 that is operated by a driver to select a shift range. The motor 4 is controlled based on the control signal S2 from the control device 3. The driving portion 50 is driven by the motor 4. The range position detection sensor 11 detects the pivot position of a range control shaft 18 for transmitting driving force from the driving portion 50 to a shift range operating portion 100 for switching a shift range. The range switching device 1 includes a case member 10. The case member 10 accommodates the motor 4, the driving portion 50, the range position detection sensor 11, and the like.

The driving portion 50 has a converting mechanism 5 for converting rotary motion of the motor to linear motion, and an arm member 6 for converting the linear motion obtained by the converting mechanism 5 into swing motion.

The shift range operating portion 100 has a spool (a range switching member) 21 that is moved by the arm member 6, and the detent mechanism 7 for positioning and holding the spool 21. The spool 21 is disposed within the valve body 9 of the automatic transmission. As shown in the figure, the parking gear mechanism 8 is provided in the automatic transmission.

The structure will now be described in detail, sequentially from the shift lever 2.

Shift ranges (not shown) of the automatic transmission, that is, P (parking) range, R (reverse) range, N (neutral) range, and D (drive) range, are indicated on the shift lever 2. The shift lever 2 is directly operated by a driver to select one of the shift ranges. A shift signal S1 corresponding to the selected range is thus generated. Note that the shift selecting portion is not limited to the shift lever 2 as long as the shift selecting portion is capable of reflecting driver's intension, that is, capable of generating a shift signal S1 corresponding to a shift range selected by the driver. For example, a shift button, a shift switch, a voice input device, or the like can be used as the shift selecting portion.

The control device 3 generates a control signal S2 based on the shift signal S1 generated by the shift lever 2, and controls rotation of the motor 4 according to the control signal S2. The control device 3 also receives a detection signal from the range position detection sensor 11. The control device 3 controls the rotation direction and the timing of starting and stopping rotation of the motor 4 based on the detection signal. In other words, the control device 3 is a control unit for controlling a so-called shift-by-wire system (SBW). Based on the shift signal S1 from the shift lever 2, the shift-by-wire system controls operation of the spool 21 by the motor 4 through the range control shaft 18 and thus switches a shift range. Note that, in FIG. 1, the control device 3 is disposed outside the case member 10. However, the control device 3 may be disposed inside the case member 10.

The motor 4 is, for example, a direct current motor having a permanent magnet. The control device 3 controls the rotation direction, the rotation time, and the rotation timing of the motor 4.

An output shaft 4a of the motor 4 is fixed so that a transmission gear 12a rotates integrally with the output shaft 4a. The transmission gear 12a meshes with a transmission gear 12b having a larger outer diameter than that of the transmission gear 12a. Rotation of the output shaft 4a of the motor 4 is thus reduced by the transmission gears 12a, 12b and then transmitted to a screw shaft 5a.

A slide screw is used as the converting mechanism 5 in the first embodiment. The slide screw as the converting mechanism 5 has the screw shaft 5a that is rotated by the motor 4, and a nut member 5b axially movably engaged with the screw shaft 5a. The screw shaft 5a is rotatably supported by the case member 10.

In FIG. 2, the nut member 5b is engaged so as to non-rotatable and axially movable with respect to rotation of the screw shaft 5a. The nut member 5b thus moves axially as the screw shaft 5a is rotated. A side surface of the nut member 5b has a protrusion 5c extending in a direction perpendicular to the screw shaft 5a. A part of the arm member 6 is engaged with the protrusion 5c. The converting mechanism 5 is thus structured so as to be capable of converting rotary motion to linear motion. Note that, for example, as the angle of thread grooves of the screw shaft 5a is increased, it becomes easier for the converting mechanism 5 to convert linear motion of the nut member 5b to rotary motion of the screw shaft 5a.

The arm member 6 has a base end 6A and a tip end 6B. The tip end 6B has a long hole 6b, and the protrusion 5c of the nut member 5b is engaged with the hole 6b. The base end 6A is supported pivotally about the range control shaft 18. The tip end 6B side of the arm member 6 thus swings as the nut member 5b moves in the axial direction of the screw shaft 5a. This swing motion pivots the range control shaft 18.

In FIG. 1, the range position detection sensor 11 is structured to output a voltage (detection signal) corresponding to the swing angle of a detent lever 26, that is, the pivot angle of the range control shaft 18.

The spool 21 is a spool within a manual valve 20 provided in the valve body 9, and has lands 21a, 21b, 21c, sequentially from the left in FIG. 1. The spool 21 is supported so as to be movable in the axial direction (the direction shown by arrow A1-A2). By moving in the axial direction, the spool 21 switches an oil passage in the valve body 9 to set a predetermined shift range. In other words, the spool 2 is movable to P position corresponding to P range, R position corresponding to R range, N position corresponding to N range, and D position corresponding to D range. The spool 21 has a shaft 24 integral with the lands 21a, 21b, 21c. An L-shaped hook 25 is formed at an end of the shaft 24.

The detent mechanism 7 has the detent lever 26, a detent spring 27, and a roller 28. The detent lever 26 is a plate-like member and is swingably supported by a part of the automatic transmission (not shown) through a shaft portion 30 to which the other end 18B of the range control shaft 18 is fixed. A long hole 31 is formed in a base end (the lower end in FIG. 1) of the detent lever 26. The hook 25 at the end of the shaft 24 of the spool 21 is engaged in the long hole 31. Four range grooves a, c, e, g as switch regions are provided in a tip end (the upper end in FIG. 1) of the detent lever 26 sequentially from the left in FIG. 1. Protrusions b, d, f are formed between the range grooves a, c, e, g, respectively. The range grooves a, c, e, g roughly correspond to P position, R position, N position, and D position of the spool 21, respectively. The word "roughly" herein means that the range grooves a, c, e, g are regions having a width (switch regions). The detent spring 27 is formed by a substantially long-plate-shaped member. As shown in FIG. 1, a base end 32 of the detent spring 27 is fixed to the valve body 9, and a forked portion 33 is formed at a tip end of the detent spring 27. The roller 28 is pivotally supported between the two branches of the forked portion 33. The detent spring 27 generally serves as a plate spring, and accurately positions and holds the detent lever 26 by pressing the roller 28, which is pivotally provided at the tip end of the detent spring 27, against a tilted surface of each range groove a, c, e, g of the detent lever 26.

As described above, in the first embodiment, the swing motion of the detent lever 26 cooperates with the movement of the spool 21 in the direction shown by arrow A1-A2. In other words, the positions of the detent lever 26 correspond the positions of the spool 21 one for one. The spool 21 is therefore accurately controlled by accurately controlling the pivot position of the detent lever 26, that is, the pivot position of the range control shaft 18 rather than directly controlling the position of the spool 21.

The parking gear mechanism 8 includes a parking rod 34, a conical wedge 35, a spring 37, a support 38, and a swingable parking pole 39. A base end side of the parking rod 34 is bent in an L-shape and is engaged with the above detent lever 26. The conical wedge 35 is loosely fitted on a tip end side of the parking rod 34 so as to be movable. The spring 37 is connected to a collar portion 36 fixed to the parking rod 34 and the wedge 35. The support 38 is disposed under the tip end side of the parking rod 34. The wedge 35 is inserted and removed between the support 38 and the parking pole 39. The parking pole 39 is provided so as to be approximately vertically swingable about a shaft 39a of its base end side. The parking pole 39 has a pawl 39b protruding from its upper side, and the pawl 39b can be engaged with and disengaged from a parking gear 29 fixed to an output shaft (not shown) of the automatic transmission.

Hereinafter, operation of the range switching device 1 having the above structure and operation of each mechanism based on the range switching device 1 will be described. Switching from P range to R range will be described below as an example.

In P range, the roller 28 of the detent mechanism 7 is positioned in the range groove a in FIG. 1. When the driver switches the shift lever 2 from P range to R range, a corresponding shift signal S1 is applied to the control device 3. The control device 3 responsively rotates the motor 4, which in turn rotates the screw shaft 5a through the transmission gears 12a, 12b. With this rotation, the nut member 5b moves in the axial direction and the arm member 6 swings accordingly. As a result, the detent lever 26 rotates counterclockwise in FIG. 1 through the range control shaft 18, and the spool 21 moves in the direction shown by arrow A1. The control device 3 stops rotation of the motor 4 when the output voltage of the range position detection sensor 11 reaches a value corresponding to switching from P range to R range. The roller 28 thus moves from the range groove a into the range groove c over the protrusion b. Since the motor 4 is stopped, the detent lever 26 is rotated by the biasing force of the roller 28 based on the elastic force of the detent spring 27. With this rotation, the roller 28 is accurately positioned and held in the range groove c. The spool 21 is thus accurately moved from P position to R position. When the motor 4 is stopped and the detent lever 26 is rotated by the above operation of the detent mechanism 7, the nut member 5b is moved in the axial direction through the range control shaft 18 and the arm member 6, whereby the screw shaft 5a is rotated.

Note that other switching operations between shift ranges are performed in the same manner as that described above.

Figure 3:
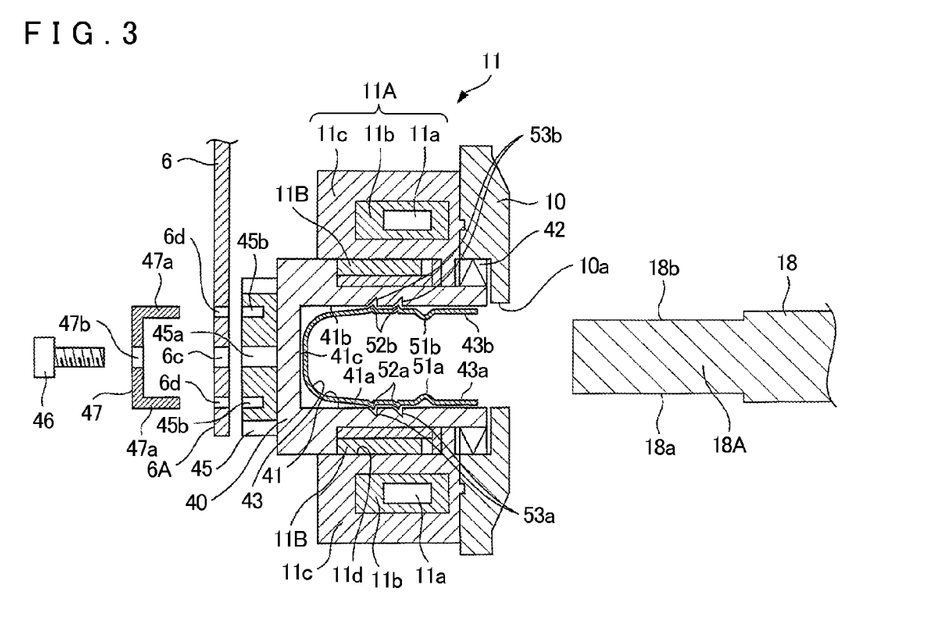
FIG. 3 is a cross-sectional view of the range switching device of the first embodiment schematically showing a state in which one end of a range control shaft is removed.

Hereinafter, a portion of the range switching device 1 for mounting one end 18A of the range control shaft 18 therein will be described in detail. FIG. 3 is a cross-sectional view of the range switching device 1 of the first embodiment schematically showing a state in which one end 18A of the range control shaft 18 is removed and the arm member 6 is detached. This state will now be described with reference to FIGS. 2 and 3.

The case member 10 has a through hole 10a though which the range control shaft 18 extends.

The range position detection sensor 11 includes a detecting portion main body 11A and a magnet 11B. The detecting portion main body 11A has a hall IC 11a as a detection element, a core 11b which has the hall IC 11a attached thereto and forms a magnetic circuit, and a holding member 11c for holding the hall IC11a and the core 11b.

The holding member 11c is fixed to the inside of the case member 10 with an adhesive or the like. The holding member 11c has a through hole 11d in a portion corresponding to the through hole 10a.

In the first embodiment, the range switching device 1 includes a rotor 40 as a support portion that is pivotally supported by the case member 10. More specifically, the rotor 40 is inserted into the through hole 11d formed in the holding member 11c of the range position detection sensor 11 and is pivotally supported by the holding member 11c fixed to the case member 10.

The magnet 11B is placed between the holding member 11c and the rotor 40. The magnet 11B is fixed to the rotor 40 and moves integrally with the rotor 40. The rotor 40 has a recess 41 for mounting one end 18A of the range control shaft 18 therein. One end 18A of the range control shaft 18 is inserted in the recess 41, and the base end 6A of the arm member 6 is fixed to the rotor 40 on the opposite side to the recess 41. The range control shaft 18 thus pivots integrally with the rotor 40 and the magnet 11B as the arm member 6 swings. The hall IC 11a as a detection element detects a change in magnetic flux of the core 11b caused by movement of the magnet 11B, and the range position detection sensor 11 thus detects the pivot position of the range control shaft 18.

The range switching device 1 includes a seal ring (sealant) 42 disposed between the case member 10 and the rotor 40 for sealing between the case member 10 and the support portion. Not a through hole but the recess 41 for receiving one end 18A of the range control shaft 18 is formed in the rotor 40.

In other words, the range control shaft 18 is not supported by a through hole but is supported by the recess 41. Therefore, even if water flows along the range control shaft 18 from the outside of the case member 10, the recess 41 of the rotor 40 blocks the water, whereby the water is less likely to enter the case member 10. A waterproof property is thus improved over the case where the range control shaft 18 is supported by a through hole.

One end 18A of the range control shaft 18 is chamfered into a prism shape (which has a rectangular cross section). More specifically, one end 18A of the range control shaft 18 is chamfered into a rectangular prism shape having four chamfered surfaces with opposing surfaces being in parallel with each other. FIG. 2 shows two parallel chamfered surfaces 18a, 18b. Note that, although four chamfered surfaces are formed in the first embodiment, the present invention is not limited to this. At least two parallel chamfered surfaces need to be formed in the present invention.

The recess 41 of the rotor 40 has a prism shape (rectangular prism shape) corresponding to one end 18A of the range control shaft 18. In other words, the recess 41 of the rotor 40 has side surfaces respectively facing the chamfered surfaces. FIG. 2 shows two parallel side surfaces 41a, 41b facing the two chamfered surfaces 18a, 18b, respectively. The range control shaft 18 and the rotor 40 can be made non-rotatable with respect to each other since the two parallel chamfered surfaces 18a, 18b face the two parallel side surfaces 41a, 41b, respectively.

In the first embodiment, there is a play between the recess 41 of the rotor 40 and one end 18A of the range control shaft 18. This play is provided in order to prevent one end 18A of the range control shaft 18 from becoming unable to be mounted in the recess 41 of the rotor 40 in a case where the respective shapes of the recess 41 of the rotor 40 and one end 18A of the range control shaft 18 do not completely conform to each other. In the first embodiment, the range switching device 1 includes a plate spring 43. The plate spring 43 is disposed in the recess 41 of the rotor 40 and serves as the removing unit for removing the play between one end 18A of the range control shaft 18 and the recess 41 of the rotor 40. The plate spring 43 is disposed between the two parallel chamfered surfaces 18a, 18b of one end 18A and the two parallel side surfaces 41a, 41b of the recess 41, and functions as the pressing unit for pressing the chamfered surfaces 18a, 18b and the two side surfaces 41a, 41b. The plate spring 43 has a substantially U-shaped cross section and is fitted in the recess 41 of the motor 40. More specifically, the spring plate 43 has a bottom plate portion 43c and two side plate portions 43a, 43b. The bottom plate portion 43c faces a bottom surface 41c of the recess 41 of the rotor 40. The two side plate portions 43a, 43b are bent at both ends of the bottom plate portion 43c and extend outward of the recess 41 (to the opening side).

Both side plate portions 43a, 43b of the plate spring 43 has spring portions 51a, 51b, respectively. The spring portions 51a, 51b are bent in a substantially V-shaped cross section toward the range control shaft 18. When one end 18A of the range control shaft 18 is inserted in the recess 41, the spring portions 51a, 51b of the spring plate 43 respectively contact the chamfered surfaces 18a, 18b of one end 18A of the range control shaft 18 and are elastically deformed. One end 18A of the range control shaft 18 is thus pressed from both sides and held by the spring portions 51a, 51b. In other words, the plate spring 43 removes the play between one end 18A of the range control shaft 18 and the recess 41 of the rotor 40. The plate spring 43 presses the two side surfaces 41a, 41b of the recess 41 and the two chamfered surfaces 18a, 18b of one end 18A of the range control shaft 18 by elastic deformation. One end 18A of the range control shaft 18 is thus non-pivotally fitted in the recess 41 through the plate spring 43 and held by the plate spring 43. One end 18A of the range control shaft 18 is thus held by the plate spring 43 and is therefore non-pivotally fitted in the recess 41. This structure prevents the range control shaft 18 from becoming loose and also allows the range control shaft 18 and the rotor 40 to pivot integrally. Since the range control shaft 18 pivots stably, the range position detection sensor 11 detects the pivot position of the range control shaft 18 with a reduced detection error, whereby shift-range switching operation is stabilized.

One side plate portion 43a of the plate spring 43 has protrusions 52a protruding toward one opposing side surface 41. The other side plate portion 43b of the plate spring 43 has protrusions 52b protruding toward the other opposing side surface 41b. The recess 41 of the rotor 40 has engaging portions 53a, 53b in the two side surfaces 41a, 41b for engaging the opposing protrusions 52a, 52b of the plate spring 43. For example, when the range control shaft 18 is removed for maintenance or the like, or during transportation before the range switching device 1 is mounted on a vehicle, the protrusions 52a, 52b of both side plate portions 43a, 43b of the plate spring 43 are engaged in the engaging portions 53a, 53b, whereby the plate spring 43 can be prevented from falling off the recess 41. The plate spring 43 can therefore be prevented from being lost during maintenance and transportation.

In the first embodiment, the rotor 40 is made of a resin. The rotor 40 has a metal fixing portion 45 fixed to the opposite side to the recess 41 for fixing the arm member 6 to the rotor 40.

The range switching device 1 includes a fixing bolt 46 and a plate member 47 having pawl portions 47a, 47a at its both ends. The fixed portion 45 of the rotor 40 has a bolt hole 45a for screwing the fixing bolt 46 therein, and fitting portions 45b, 45b for fittingly receiving the pawl portions 47a, 47a of the plate member 47. Note that the arm member 6 has a hole 6c for inserting the fixing bolt 46 therethrough, and holes 6d, 6d for inserting the pawl portions 47a, 47a therethrough. The plate member 47 has a hole 47b for inserting the fixing bolt 46 therethrough.

The arm member 6 is fixed to the fixing portion 45 of the rotor 40 by the plate member 47 and the fixing bolt 46. More specifically, the pawl portions 47a, 47a of the plate member 47 are fitted in the fitting portions 45b, 45b through the holes 6d, 6d of the arm member 6 and the arm member 6 is pressed against the rotor 40 by the plate member 47. In this state, the fixing bolt 46 is screwed into the bolt hole 45a through the hole 47b of the plate member 47 and the hole 6c of the arm member 6. The arm member 6 is thus integrally fixed to the rotor 40 together with the plate member 47. If the arm member is fixed to the rotor as the support portion only by a bolt, the arm member may be displaced with respect to the rotor in a pivoting direction due to impact or the like. In the first embodiment, however, the plate member 47 having the pawl portions 47a, 47a is used to fix the arm member 6. The arm member 6 and the rotor 40 are therefore more firmly fixed to each other, and the arm member 6 can be prevented from becoming loose with respect to the rotor 40.

It may be considered to use a ball screw as the conversion mechanism of the range switching device shown in the first embodiment. In this case, the ball screw has a ball screw shaft that is rotated by a motor, a ball nut axially movably engaged with the ball screw shaft screw, and a multiplicity of balls provided between the ball screw shaft and the ball nut. The arm member needs to have a forked portion at its tip end and needs to be connected to the ball nut so that the ball screw shaft and the ball nut are interposed between the two branches of the forked portion. In other words, when the ball nut and the arm member are connected at one position, the ball nut is skewed with respect to the ball screw shaft. As a result, the balls do not circulate smoothly, thereby hindering movement of the boll nut.

The first embodiment, on the other hand, uses a slide screw, whereby the nut member 5b and the arm member 6 can be connected at one position. The arm member 6 therefore need only be pressed onto the nut member 5b when the arm member 6 is fixed to the rotor 40 with the fixing bolt 46 and the plate member 47. This structure thus stabilizes operation of the nut member 5b and operation of the arm member 6 connected to the nut member 5b, and therefore stabilizes shift-range switching operation.

[Second Embodiment]

Description of the first embodiment was given to the case where the plate spring 43 is used as the pressing unit serving as the removing unit for removing a play. In the second embodiment, description is given to the case where tapered portions for pressing one end 18A of the range control shaft 18 therein are used as the pressing units serving as the removing units. Note that, in the second embodiment, the same structure as that of the first embodiment was denoted with the same reference numerals and characters and description thereof will be omitted.

Figure 4:
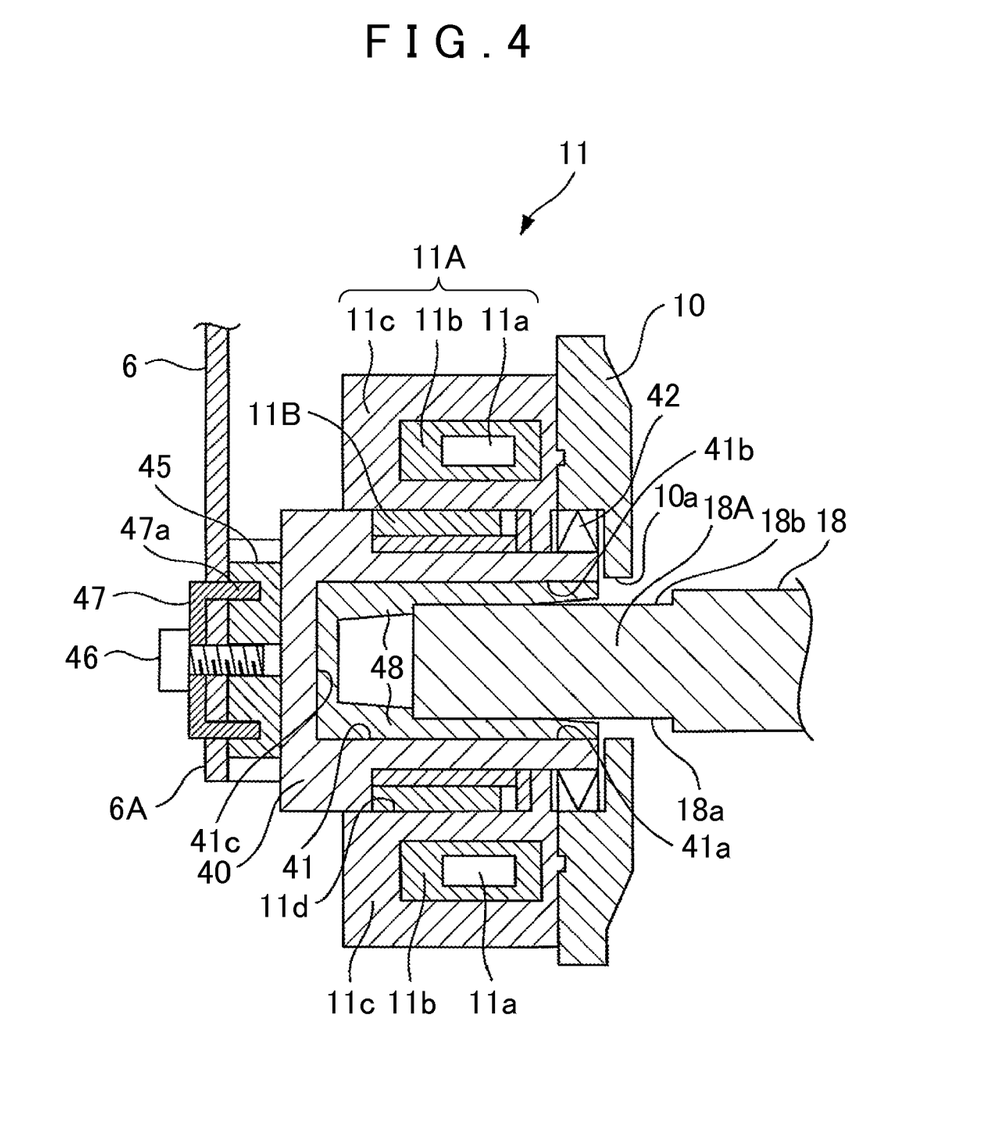
FIG. 4 is a schematic cross-sectional view of a main part of a range switching device according to a second embodiment.
Figure 5:
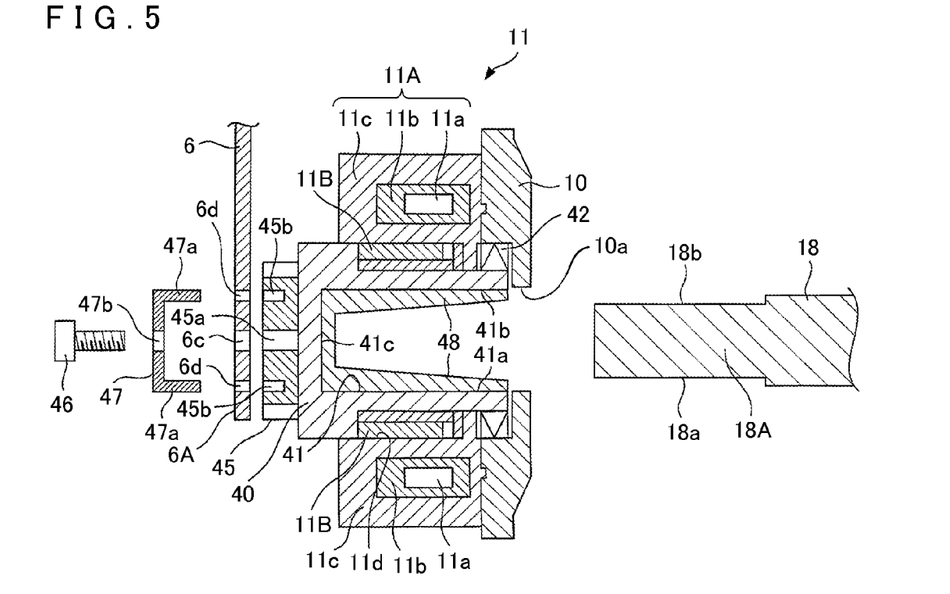
FIG. 5 is a cross-sectional view of the range switching device of the second embodiment schematically showing a state in which one end of a range control shaft is removed.

FIG. 4 is a cross-sectional view schematically showing a main part of a range switching device of the second embodiment. FIG. 5 is a cross-sectional view of the range switching device 1 of the second embodiment schematically showing a state in which one end 18A of the range control shaft 18 is removed and the arm member 6 is detached.

In the second embodiment, the range switching device includes tapered portions 48 as the pressing unit serving as the removing unit. The tapered portions 48 are fixed to the recess 41 of the rotor 40 and respectively face the chamfered surfaces 18a, 18b of one end 18A of the range control shaft 18 and are tapered toward the bottom surface 41c of the recess 41. In the second embodiment, the rotor 40 is made of a metal that is not magnetized, and the tapered portions 48 are made of a resin. The tapered portions 48 are fixed to the side surfaces 41a, 41b of the recess 41 with an adhesive or the like. Note that the rotor 40 may be made of a resin and the tapered portions 48 may be formed integrally with the rotor 40.

In the second embodiment, one end 18A of the range control shaft 18 has four chamfered surfaces. Therefore, four tapered portions 48 are provided corresponding to the number of the chamfered surfaces (FIGS. 4 and 5 show two tapered portions). The four tapered portions 48 are integrally connected together at the position facing the bottom surface 41c of the recess 41. Note that the number of tapered portions 48 is not limited to four, and at least one tapered portion 48 can be provided.

The tapered portions 48 can smoothly guide the one end portion 18A of the range control shaft 18 into the recess 41 of the rotor 40. Moreover, a play between one end 18A of the range control shaft 18 and the recess 41 of the rotor 40 is removed by pressing one end 18A of the range control shaft 18 into the tapered portions 48. The four tapered portions 48 are compressively deformed when one end 18A of the range control shaft 18 is pressed into the tapered portions 48. The tapered portions 48 therefore presses the two parallel side surfaces 41a, 41b and not-shown two parallel side surfaces of the recess 41 and also presses the two parallel chamfered surfaces 18a, 18b and not-shown two parallel chamfered surfaces of one end 18A of the range control shaft 18, respectively. As a result, one end 18A of the range control shaft 18 is firmly pressed, whereby the range control shaft 18 can be prevented from becoming loose.

Note that although the present invention has been described based on the first and second embodiments, the present invention is not limited to these embodiments.

Description of the first embodiment was given to the case where the range switching device includes the plate spring 43 as the removing units, and description of the second embodiment was given to the case where the range switching device includes the tapered portions 48 as the removing unit. However, the range switching device may include both the plate spring 43 and the tapered portions 48 as the removing units. More specifically, two tapered portions 48 may be disposed in the recess 41 of the rotor 40 as the support portion so as to face each other and the plate spring 43 may be disposed perpendicularly to the tapered portions 48. In this case, one pair of chamfered surfaces of one end 18A of the range control shaft 18 are held by the plate spring 43 and the other pair of chamfered surfaces are pressed into the tapered portions 48. This structure can more effectively prevent the range control shaft 18 from becoming loose.

In the present embodiment, the range switching device operates the manual valve, the parking gear mechanism, and the like. However, the range switching device may operate any element as long as the range switching device operates the element through the range control shaft. For example, the present invention is applicable to the case where the range switching device switches only the parking gear mechanism through the range control shaft.

The vehicle range switching device of the present invention is mounted on vehicles such as a passenger car, a truck, a bus, an agricultural machine, and can be used to switch a shift range by operating a manual valve, a parking gear mechanism, and the like through a range control shaft. The present invention is preferably used in a range switching device which requires a waterproof property and needs to prevent a range control shaft from becoming loose.

What is claimed is:

1. A vehicle range switching device including a motor that is controlled according to operation of a shift range selecting portion, a driving portion that is driven by the motor, and a detecting portion for detecting a pivot position of a range control shaft for transmitting driving force from the driving portion to a shift range operating portion for switching a shift range, comprising:
    a case member accommodating the driving portion and the detecting portion;
    a support portion pivotally supported by the case member and having a recess for mounting one end of the range control shaft therein, wherein the support portion and the case member are sealed; and
    a removing unit disposed in the recess of the support portion for removing a play between the one end of the range control shaft and the recess of the support portion.

2. The vehicle range switching device according to claim 1, wherein
    the one end of the range control shaft has at least two parallel chamfered surfaces,
    the recess has two parallel side surfaces respectively facing the chamfered surfaces, and
    the removing unit is a pressing unit disposed between the two chamfered surfaces and the two side surfaces for pressing the two chamfered surfaces and the two side surfaces.

3. The vehicle range switching device according to claim 2, wherein the pressing unit is a plate spring having a substantially U-shaped cross section, being fitted in the recess and elastically deformed to be fitted between the two chamfered surfaces and the two side surfaces, thereby holding the one end of the range control shaft.

4. The vehicle range switching device according to claim 3, wherein the plate spring has protrusions respectively protruding toward the two side surfaces, and the two side surfaces have engaging portions for engaging the respective protrusions.

5. The vehicle range switching device according to claim 2, wherein the pressing unit is a tapered portion that is tapered toward a bottom surface of the recess and one end of the range control shaft is pressed into the tapered portion.

6. The vehicle range switching device according to claim 1, wherein
    the driving portion has a converting mechanism for converting rotary motion of the motor to linear motion, and an arm member for converting the liner motion obtained by the converting mechanism to swing motion,
    the arm member is attached to the support portion, and
    the range control shaft is pivoted integrally with the support portion by the swing motion of the arm member.

7. The vehicle range switching device according to claim 6, further comprising:
    a fixing bolt and a plate member having pawl portions at its both ends, wherein
    the support portion has fitting portions in which the pawl portions of the plate member are respectively fitted, and
    the pawl portions of the plate member are fitted in the fitting portions of the support member through the arm member, and the plate member and the arm member are integrally fixed to the support portion by the fixing bolt.

* * * * *